United States Patent [19]
Hoerger

[11] Patent Number: 5,883,771
[45] Date of Patent: Mar. 16, 1999

[54] SINGLE REEL TAPE CARTRIDGE WITH LOCKING LEADER BLOCK

[75] Inventor: Carl R. Hoerger, Boise, Id.

[73] Assignee: Hewlett-Packard Company, Palo Alto, Calif.

[21] Appl. No.: 937,422

[22] Filed: Sep. 25, 1997

[51] Int. Cl.[6] .............................. G11B 23/02; G03B 1/58; G03B 23/02
[52] U.S. Cl. .................... 360/132; 242/332.4; 242/348.2
[58] Field of Search ...................... 360/132, 94; 242/348, 242/348.1, 348.2, 348.3, 332.4

[56] References Cited

U.S. PATENT DOCUMENTS

| | | | |
|---|---|---|---|
| 3,287,777 | 11/1966 | Cranwill | 206/53 |
| 4,383,660 | 5/1983 | Richard et al. | 242/348.2 |
| 5,002,237 | 3/1991 | Hirayama | 242/345 |
| 5,492,284 | 2/1996 | Sorensen | 242/348.2 |
| 5,547,142 | 8/1996 | Cheatham et al. | 242/338.1 |

*Primary Examiner*—David D. Davis

[57] ABSTRACT

A tape cartridge for use with an operatively compatible tape drive having a tape reeling mechanism, the cartridge comprising a housing having an opening therein, a tape-supply reel within the housing, with magnetic tape wound on the reel and having a free end proximate the housing opening, and a leader block having a first end attached to the free end of the magnetic tape, a second end dimensioned to be operatively compatible with a tape drive leader block retriever, and a reel-locking surface, wherein the reel-locking surface of the leader block is located facing the reel when the leader block is in the housing. The leader block functions to lock the supply reel in a stationary position in the cartridge housing, when the leader block is resident in the housing with the supply reel.

13 Claims, 6 Drawing Sheets

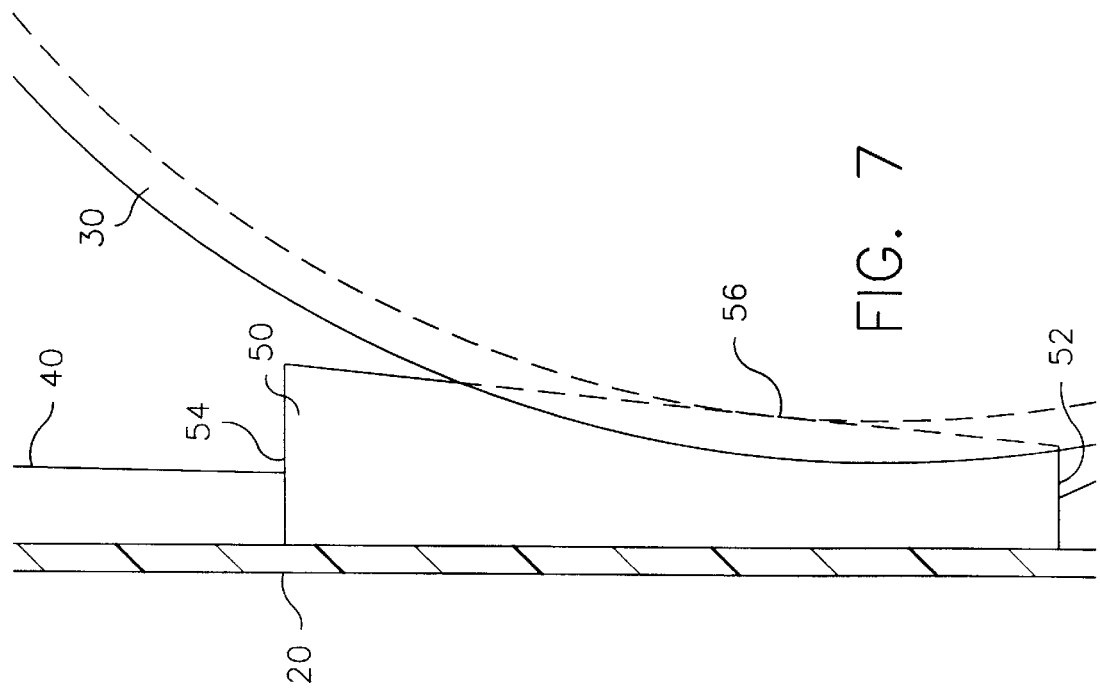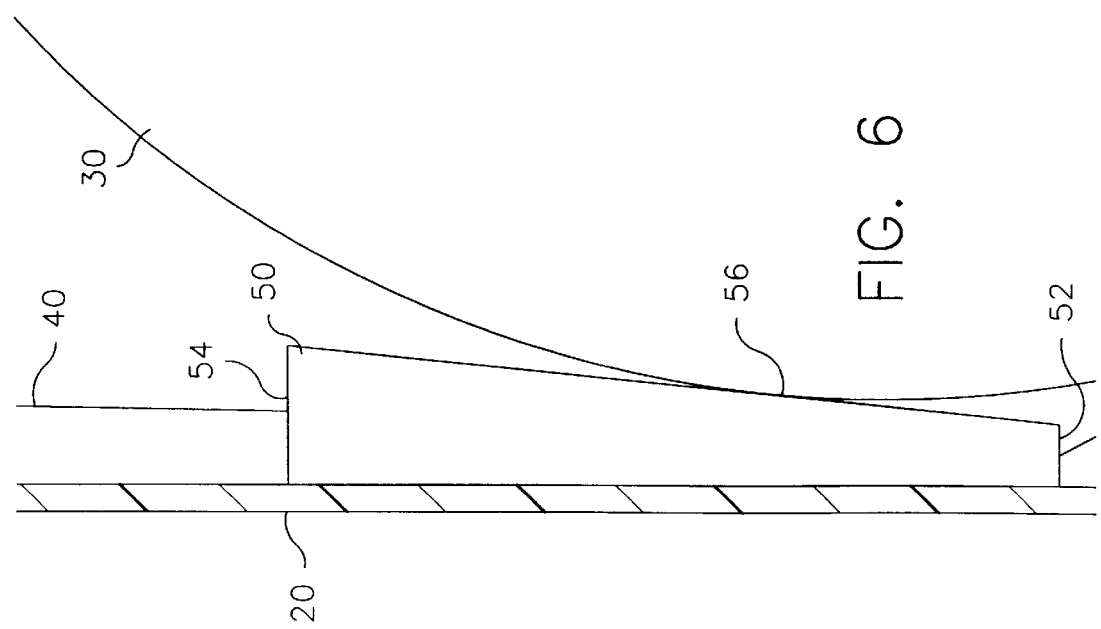

SINGLE REEL TAPE CARTRIDGE WITH LOCKING LEADER BLOCK

FIELD OF THE INVENTION

This invention relates to magnetic tape drives in general, and in particular to single reel recording tape cartridges that include a leader block attached to the recording tape.

BACKGROUND OF THE INVENTION

A widely used medium for storing data is recording tape, which is typically a polymer tape with a magnetic coating. One of the most popular formats of use for the storage of data on tape is tape cartridges. Tape cartridges are generally smaller, simpler and less expensive than reel-to-reel tape systems.

Two widely used formats of tape cartridges are the two-reel cartridge, which is typically in a quarter-inch tape format, and the single, supply-reel cartridge, generally a half-inch tape format cartridge. By enclosing the tape within a housing or cartridge, the tape, and therefore the data stored on the tape, are better protected from damage than the more exposed reel-to-reel systems of tape data storage.

The single, supply-reel or half-inch cartridge is able to store much more data than the quarter inch cartridge. Typically, the free end of the tape in the cartridge is attached to a leader block. The leader block is fashioned to act as a barrier or door when the cartridge is not in use, and thereby substantially close off the cartridge from potential sources of harm such as dust, particulate matter contamination and other forms of environmental stress or damage. When the cartridge is in use, the leader block's function is to provide a structure to allow the tape to be withdrawn from the cartridge, into the tape drive for data recording or retrieval. The take-up reel or spool is built into the tape drive along with an automatic tape threading mechanism. The automatic tape threading mechanism includes a means for capturing the leader block, typically the capture is by a tape threading pin, and then the mechanism appropriately threads the leader block and tape in the tape drive.

The recording of data onto the tape is generally referred to as "writing" to the tape and the retrieval of information already written or stored on the tape is referred to as "reading" from the tape. The part of the tape system responsible for these activities is generally referred to as the read/write head. The tape drive that performs the read/write operations is also referred to as a tape "transport."

Typically, the standard tape transport or drive accepts the tape cartridge into an elevator assembly. A threading mechanism grabs the leader block and pulls it free from the cartridge. The leader block is then used to thread the tape through a path which includes a series of guide posts, across the longitudinal read/write head, and into a slot in the take-up reel. Once threaded, the tape from the cartridge can be driven across the read/write head(s) for data transfer operations and wound onto the take-up reel.

The take-up reel is typically configured with a slot in one surface that allows the insertion of the leader block into the hub of the take-up reel in a manner that, ideally, allows the tape to wind smoothly onto the take-up reel. The leader block is captured by a threading pin attached to a threading or threader arm assembly. The threading arm then pulls the leader block in a counter-clockwise direction through the tape path and inserts the leader block into the hub of the take-up reel. During winding on of the tape onto the take-up reel, the leader block spins around the threading pin, as the pin and the take-up reel have the same axis of rotation in this configuration. When the leader block is fully inserted into the take-up reel, the leader block forms a part of the outer circumference of the take-up reel and thus, the magnetic tape winding surface. The leader block and take-up reel are fabricated with a degree of precision so that when the leader block is inserted into the slot in the take-up reel, the slot is closed by the end of the leader block so that a relatively smooth surface is created on the hub of the take-up reel for winding the tape on the hub.

Ideally, the tape cartridge, or housing and all of the components are designed and manufactured to promote the best possible storage and retrieval of data on the tape. One important goal in the design and manufacture of the components is to have the tape wind smoothly through the drive and onto and off of both the supply reel and the take-up reel. Unfortunately, there are numerous potential hazards in the structures and functions of the single reel tape system that make obtainment of consistently smooth tape winding problematical. Any misalignment of the magnetic tape within the system can result in a non-uniform tape winding surface which causes undesirable irregularities in the magnetic tape as it is wound or unwound from either reel. Small misalignments between the inserted leader block and the hub are commonplace and represent a source of undesirable risk of failure in tape systems. Such misalignments can garble data and operations, causing errors in either or both the writing of data to the tape and reading of data from the tape.

Improvements in the functioning of the tape storage and retrieval system are constantly sought to decrease sources of error and failure in data storage and retrieval. Whenever data is transmitted and wherever it is stored, it is vulnerable to many different forces and conditions that can physically distort the record, changing the character of the data. Any source of error is problematical to the accurate and successful recording and retrieval of data to and from the tape. Irretrievable data can be catastrophic at worst and is always undesirable. The consequences can be devastating; for example, as little as a single wrong data bit can change the meaning of an entire sequence of bits, perhaps throwing off a complex mathematical calculation or causing a computer to misinterpret a command. The sources of risk for error and failure are under constant scrutiny for reduction and elimination in the industry. A combination of strategies may be best to safeguard the data from the inevitable assault of errors.

One place in the system where an impediment to smooth winding tape can develop is the supply reel, in the tape cartridge. When the cartridge is not in use in a tape drive, it is possible in some cartridges for the tape to lose tension and become partially unwound from the reel. When the tape is loose and unwound, it is possible for the tape to loop back on itself. The tape can be damaged as a result of the loose wraps and misalignments, for example, the recording side of the tape coming in contact with itself and causing damage. Loose or misaligned tape on the reel can also be damaged by sharp creases being put in the tape, if the looped-back sections inadvertently become trapped and rewound tightly and under tension on the supply reel or through snapping and possibly breaking the tape when tension is restored to the tape in the cartridge. To prevent problems and failures caused by this nature of problem, one solution has been to add additional structures to the cartridge. For example, spring-biased catches, that grab either an added brake structure, or the drive gears that are integrated on the reel, for engagement with the torque motor when in the tape drive, have been utilized. Such structures do help to reduce the likelihood of the tape coming loose off the supply reel, but the additional structures also come with their own characteristic disadvantages. Every added structure adds undesirably to the cost and complexity of the system. Added structures also represent their own potential basis of system failures, in the form of malfunctioning or broken parts and components.

There is still a demand and need for methods and apparatus to reduce the possible sources of error in tape recording systems.

SUMMARY OF THE INVENTION

The invention comprises, in general terms, a tape cartridge for use with an operatively compatible tape drive having a tape reeling mechanism, the cartridge comprising a housing having with an opening therein, a tape-supply reel within the housing, magnetic tape wound on the reel and having a free end proximate the housing opening, and a leader block having a first end attached to the free end of the magnetic tape, a second end dimensioned to be operatively compatible with a tape drive leader block retriever, and a reel-locking surface, wherein the reel-locking surface of the leader block is located facing the reel when the leader block is in the housing. The leader block functions to lock the supply reel in a stationary position in the cartridge housing, when the leader block is resident in the housing with the supply reel.

Additional advantages and novel features of the invention will be set forth in part in the description that follows, and in part will become apparent to those skilled in the art upon examination of the following or may be learned by practice of the invention. The advantages of the invention may be realized and attained by means of the instrumentalities and combinations particularly pointed out in the appended claims.

DESCRIPTION OF THE DRAWINGS

FIG. 6 is a schematic detail view showing another embodiment of the present invention with a smooth rim-locking surface on the leader block.

FIG. 7 is a schematic detail view showing another embodiment of the present invention with a smooth reel-locking surface on the leader block

DETAILED DESCRIPTION OF THE INVENTION

Figure 1:
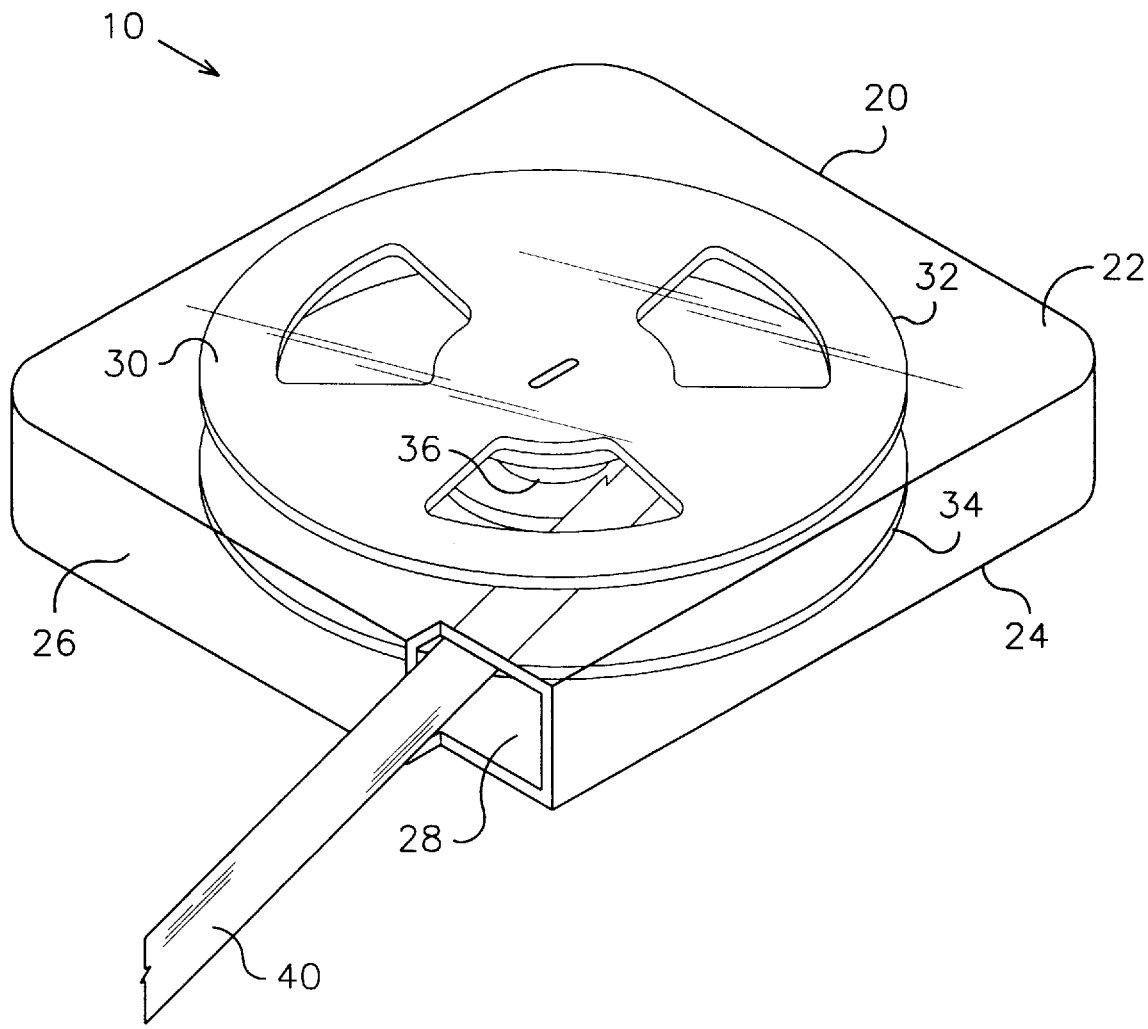
FIG. 1 illustrates a typical tape cartridge suitable for this invention.

Referring to FIGS. 1–7, an exemplary embodiment of the present invention is described herein. The tape cartridge of the present invention generally includes at least a housing 20, a tape supply reel 30, with magnetic tape 40 and leader block 50.

Housing 20 of cartridge 10 is generally rectangular in shape and generally a box-like structure, adapted to enclose a single reel of tape. Housing 20 includes a top section 22, which is parallel to a bottom section 24, with top 22 and bottom 24 being joined by a plurality of sidewalls 26. Sidewalls 26 are perpendicular to top 22 and bottom 24. Housing 20 further includes a leader block window 28. Although housing 20 is generally rectangular in shape, a shortened, angled additional sidewall is optionally included, as the location of leader block window 28. In the case where the additional shortened side wall is added, housing 20 is still substantially rectangular with the fifth side appearing as a notched or flattened corner, on one of the corners of the rectangle. Leader block window 28 permits the entry and exit of leader block 50 through window 28, as will be described in more detail below.

Tape supply reel 30 has a top rim 32, bottom rim 34 and tape-winding hub 36. Supply reel 30 is disposed at the approximate center of top and bottom sections 22 and 24, of housing 20. A drive spindle (not shown) is attached to the bottom side of supply reel 30, for engagement with the torque motor or other appropriate supply reel drive mechanism in the tape drive where cartridge 10 would be used.

A length or web of magnetic tape 40 is wound on to hub 36 of supply reel 30. Typically, tape 40 is wound on to reel 30 in a counterclockwise direction. A fixed end (not shown) of tape 40 is attached by any appropriate means to hub 36. Tape 40 is disposed in wraps around hub 36, as is well known to one skilled in the art.

Free end 42 of tape 40 is attached to first end 52 of leader block 50. Leader block 50 includes first end 52, second end 54 and a reel-locking surface 56. First end 52 of leader block 50 is dimensioned for attachment to free end 42 of tape 40. Second end 54 of leader block 50 is dimensioned to be operatively compatible with a leader block retriever (not shown). Typically, the retriever is part of an automatic threading component resident in the tape drive unit.

Reel-locking surface 56 of block 50 is located between first end 52 and second end 54 of block 50. Locking surface 56 is positioned on block 50 such that when block 50 is resident inside housing 20, locking surface 56 is facing reel 30, rather than a sidewall of housing 20. Block 50 functions to immobilize or lock reel 30 in a stationary position, thereby inhibiting tape 40 from unwinding or becoming loosely wound on reel 30. An important feature of cartridge 10 is that contact caused by leader block 50 is purposefully made with reel 30 when leader block 50 is resident in housing 20.

Figure 2:
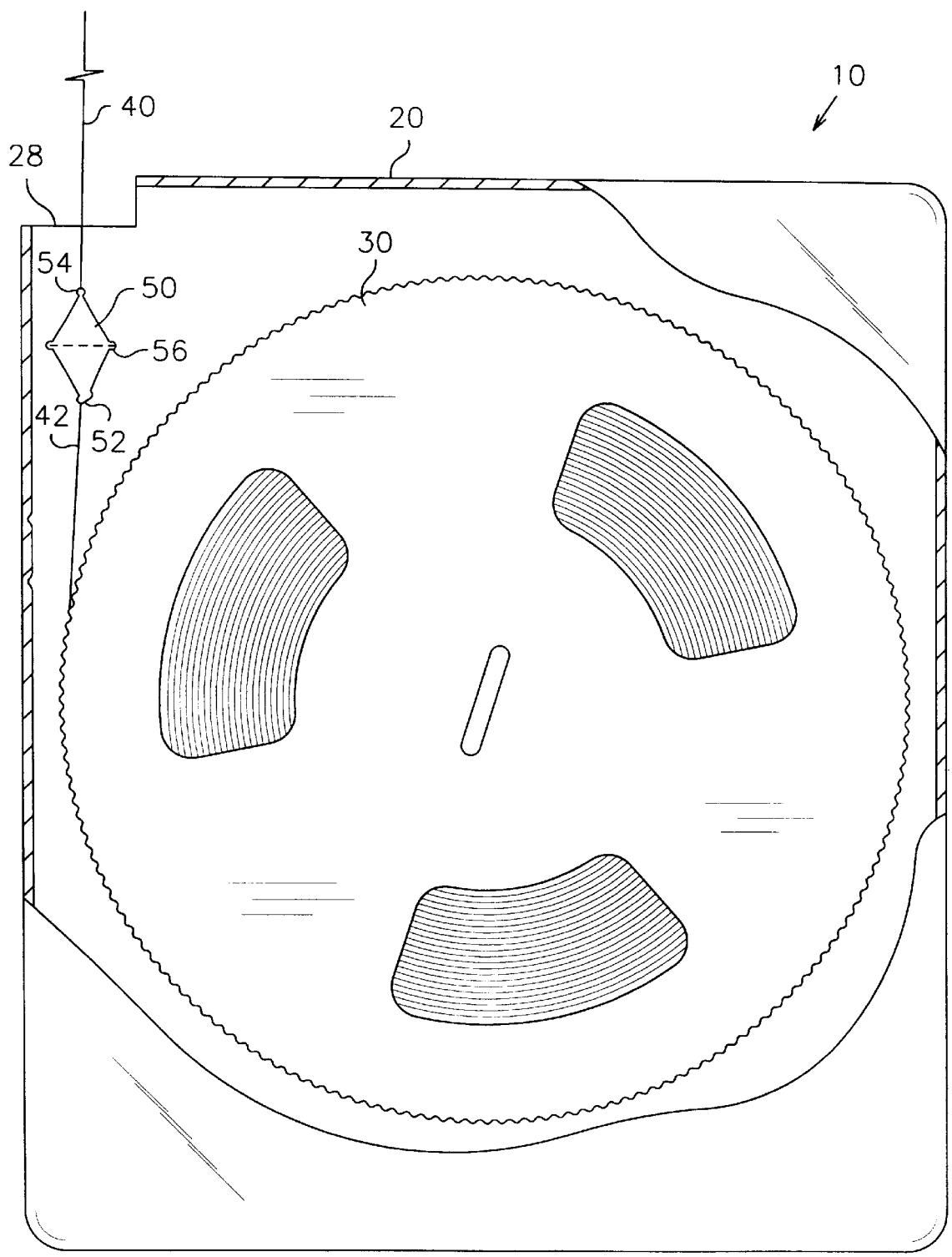
FIG. 2 is a schematic partial cutaway showing an embodiment of the present invention with a toothed rim on a supply reel and a toothed leader block.
Figure 3:
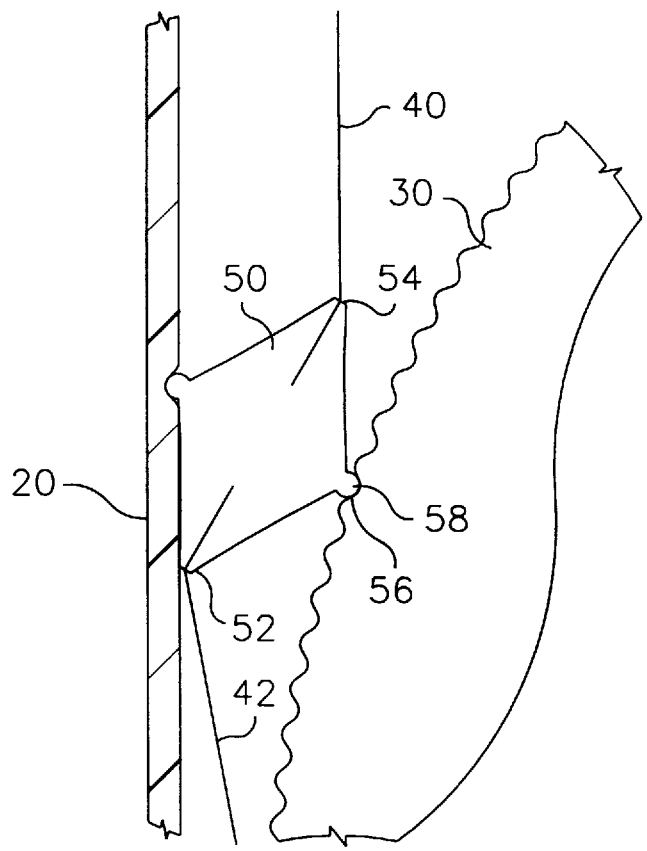
FIG. 3 is a schematic detail view of the embodiment shown in FIG. 2.

In one embodiment, at least one rim, in the case of FIGS. 2 and 3, it is top rim 32, of reel 30 has a toothed edge. Toothed in this context is meant to include both sharp-angled and rounded combinations of protrusions and indentations. Here locking surface 56 of leader block 50 would possess one or more either similarly shaped teeth, or alternatively, complimentary shaped teeth.

In the exemplary embodiment shown in FIG. 3, a complimentary tooth 58 is shown. It is desirable for block 50 to directly contact a rim of reel 30 to lock it in a stationary position, as shown in FIG. 3.

Figure 4:
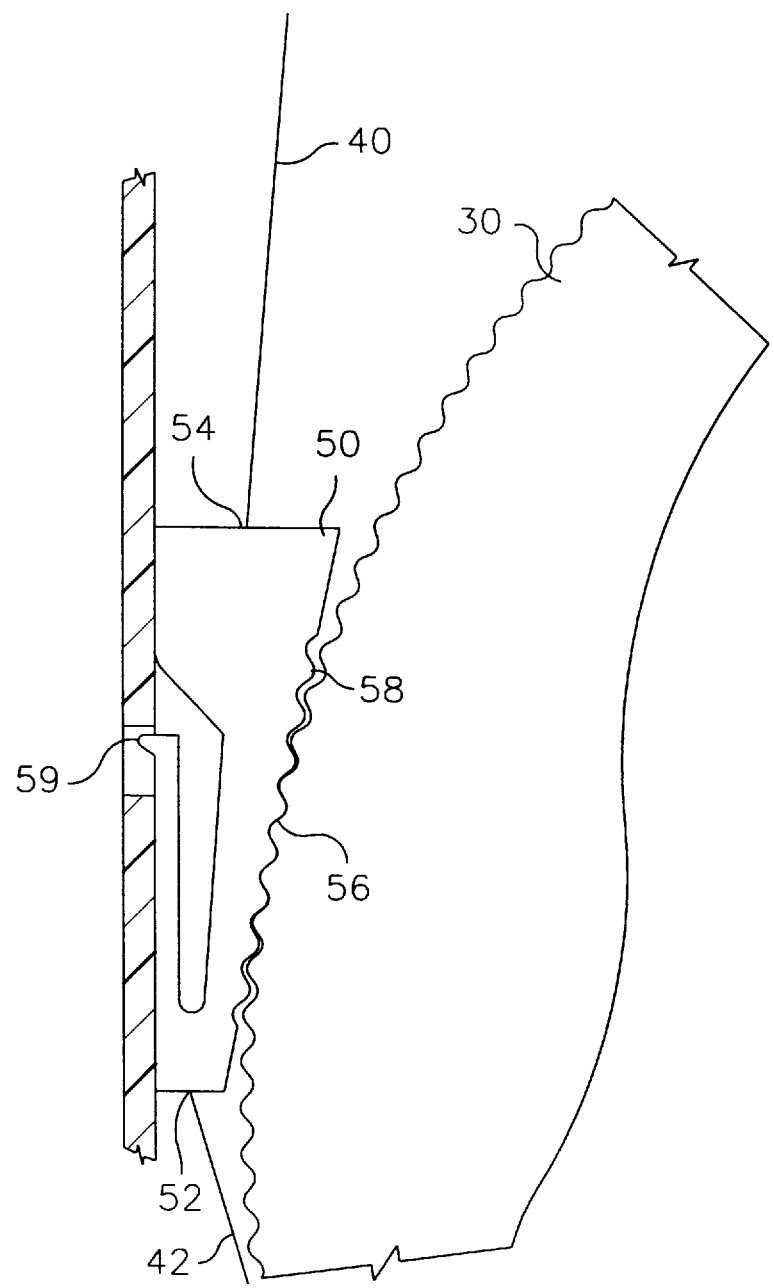
FIG. 4 is a schematic detail view showing another embodiment of the invention with a snap feature opposite the rim locking surface.

In another embodiment, in addition to the toothed edge of one rim of reel 30 and teeth 58 on locking surface 56 of leader block 50, as described above and shown in FIG. 3, the surface opposite locking surface 56 possesses a detent device 59, as shown in FIG. 4. Detent device 59 biases against a sidewall 26 of housing 20. Side wall 26 may optionally be modified to receive detent device 59 in releasable, captive fashion, for example side wall 26 may be notched, or manufactured with a non-smooth surface, or from a material with a high coefficient of friction.

Figure 5:
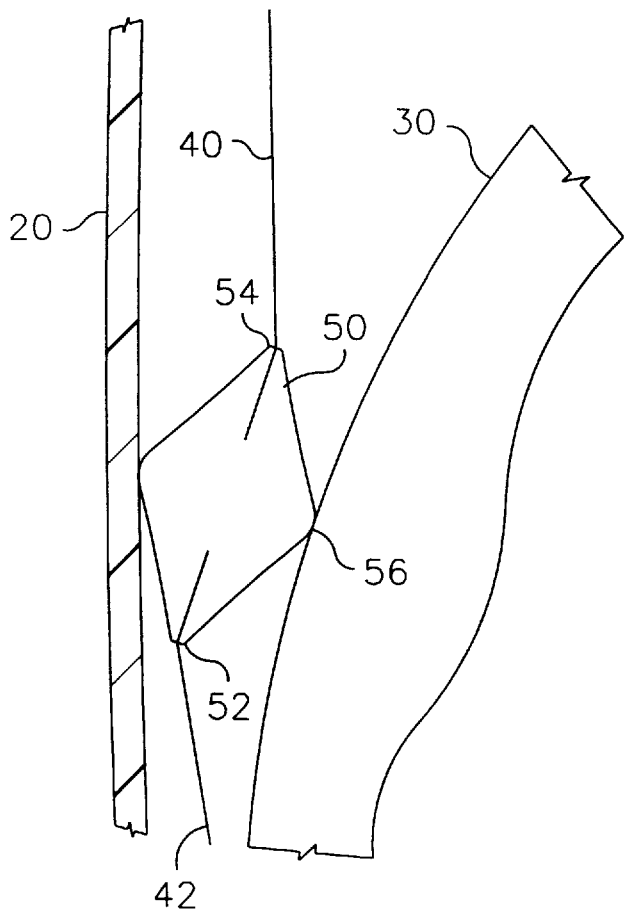
FIG. 5 is a schematic detail view showing another embodiment of the present invention with a smooth rim-locking surface on the leader block.

In another embodiment rims 32 and 34 of reel have an approximately smooth edge, typical of tape reels known in the art. Here, as shown in FIG. 5, block 50 is dimensioned so that it functions to lock reel 30 in a stationary position by contacting at least one rim of reel 30. In FIG. 6, for ease of illustration, locking surface 56 of block 50 is firmly positioned in contact with top rim 32 of reel 30. It should be understood that leader block 50 could also be in contact with just bottom rim 34, or both rims 32 and 34, and still function as intended.

In another embodiment, block 50 is dimensioned so that it functions to lock reel 30 in a stationary position by firm contact with the outermost wrap of tape 40, as shown schematically in FIG. 7.

The use of the invention, as described in these illustrative embodiments, includes the steps and structures necessary for understanding and explaining the invention and it's use. Other typical steps and structures that are normally related to the use of the invention and well known to one skilled in the art, but that are not essential to the understanding of the present invention, are not described in detail herein, to avoid confusion.

In this example, leader block 50 originates in an inactive, or locking, position in cartridge 10. Tape cartridge 10, when not in a tape drive, would have leader block 50 resident inside housing 20. It is desirable that leader block 50 is configured to occlude window 28, as well as lock reel 30 when leader block 50 is resident in housing 20. In this resident and inactive configuration locking surface 56 would be facing supply reel 30 and functioning to lock reel 30 in a stationary position.

In use, tape cartridge 10 would be inserted into a tape drive and a leader block retriever would captively engage with leader block 50. After the engagement, leader block 50 would then be pulled from housing 20, through leader block window 28, along with attached data tape 40, through an appropriate path to thread data tape 40 in the tape drive unit for read/write operations. During read/write operations, tape 40 will be wound on to a take-up reel in the tape drive unit, as is well known in the art. As the take-up reel continues rotating in the same winding-on direction, data tape 40 is then wound smoothly on the take-up reel. As more and more wraps of data tape 40 continue to wrap on top of each other, the storage space on the take-up reel will become filled with tape 40.

In the reverse operation, where tape 40 is unwound from the take-up reel, and wound back onto supply reel 20 in cartridge 10, essentially the same sequence of events happens, but in reverse order. That is to say, data tape 40 simultaneously unwinds from the take-up reel and winds onto supply reel 20, traveling the opposite direction through the tape threading path. When all of the data tape is wound onto supply reel 20 the tape retriever is disengaged from leader block 50, and then leader block 50 will be again located in housing 20 in the initial position from whence this description started. Cartridge 10 is then ready for removal from the tape drive or transport (not shown).

It is to be understood that, in any embodiment, leader block 50 would still function to lock reel 30 in a stationary position even if an intervening structure were to be between reel 30 and leader block 50. One example would be an additional small gear or cog associated with the outer edge of either or both rims of reel 30. Likewise it should also be understood that, in any embodiment, it is contemplated that either leader block locking surface 56, rims 32 or 34 of reel 30, or any combination of those structures could be manufactured from materials which further augment the locking relationship of locking surface 56 and reel 30, when they are both resident in housing 20. One such example would be to use materials for the above mentioned structures with a coefficient of friction that improves the locking relationship, as described above.

An important feature of this invention is that leader block 50 is not segregated from the part of housing 20 wherein supply reel 30 is disposed. This allows leader block 50 to function to lock reel 30 into a stationary position in housing 20, either by direct contact with reel 30 or through contact with an intervening structure as described above. It is most desirable that reel 30 is locked in to a stationary position in housing 20 with tape 40 under mild tension.

The present invention allows simplification of the construction of cartridge 10 by elimination of dedicated, additional components for braking or locking reel 30. Further, this invention reduces the number of parts required for such a cartridge and therefore also reduces the potential fail modes for the cartridge.

It is contemplated that this invention can be used with a wide variety of threading and/or tape supply mechanisms. For example the invention can be used with a variety of threading arm and threading pin combinations delivering leader block 50 into the take-up reel of the tape drive unit. Likewise it is contemplated that one skilled in the art would recognize that leader block 50 can be appropriately delivered and secured within the take-up reel by a variety of means.

It will therefore be understood that modifications and variations are possible without departing from the scope of the invention as expressed in the following claims.

What is claimed is:

1. A tape cartridge for use with an operatively compatible tape drive having a tape reeling mechanism, comprising:

a housing having an opening therein;

a tape-supply reel rotatably disposed within the housing;

a web of magnetic tape wound on said tape reel and having a free end disposed proximate said housing opening; and a leader block having a first end, a second end, and a reel-locking surface, the first end of the leader block being attached to the free end of the magnetic tape and the second end being dimensioned to operate with a tape drive leader block retriever, said reel-locking surface of the leader block contacts the reel when the leader block is in the housing and the leader block contacts the housing to lock the reel in a stationary position inhibiting the magnetic tape from unwinding or becoming loosely wound on the reel.

2. A tape cartridge for use with an operatively compatible tape drive having a tape reeling mechanism, comprising:

a housing having an opening in one corner thereof and enclosing a tape supply reel rotatably mounted in the housing;

the tape-supply reel having a top rim, a bottom rim and a central hub;

a web of magnetic tape wound on the tape reel and having a free end disposed proximate the housing opening; and a leader block having a first end, a second end, and a reel-locking surface, the first end being attached to the free end of the magnetic tape and the second end being dimensioned to operate with a tape drive leader block retriever, the reel-locking surface located between the first end and the second end, of the leader block the reel-locking surface, which is proximate to a rim of the tape reel, contacts the tape reel when the leader block is in the housing and the leader block contacts the housing to lock the reel in a stationary position inhibiting the magnetic tape from unwinding or becoming loosely wound on the reel.

3. The tape cartridge of claim 2 wherein at least one of the tape-supply reel rims is configured for releasably locking with the reel-locking surface of the leader block.

4. The tape cartridge of claim 2 wherein at least one rim of the supply reel is toothed.

5. The tape cartridge of claim 2 wherein at least one rim of the supply reel has an edge with a high coefficient of friction.

6. The tape cartridge of claim 2 wherein the leader block locking surface is manufactured from a material with a high coefficient of friction.

7. The tape cartridge of claim 2 wherein the leader block locking surface and at least one rim of the supply reel has an edge manufactured from a material with a high coefficient of friction.

8. A tape cartridge for use with an tape drive having a tape reeling mechanism, comprising:

a housing having an opening therein;

a tape-supply reel rotatably disposed within the housing, the tape-supply reel having a top rim, a bottom rim and a central hub;

a web of magnetic tape wound on said tape reel and having a free end disposed proximate said housing opening; and a leader block having a first end, a second end, a reel-locking surface, and a detent device, the first end of the leader block being attached to the free end of the magnetic tape, the second end being dimensioned to operate with a tape drive leader block retriever, said reel-locking surface of the leader block being between the first and second end, the reel-locking surface contacts the reel when the leader block is in the housing, and the detent device being located opposite the reel-locking surface between the first end and second contact the housing when the leader block is in the housing and the leader block contacts the housing to lock the reel in a stationary position inhibiting the magnetic tape from unwinding or becoming loosely wound on the reel.

9. The tape cartridge of claim 8 wherein at least one of the tape-supply reel rims is configured for releasably locking with the reel-locking surface of the leader block.

10. The tape cartridge of claim 8 wherein at least one rim of the supply reel is toothed.

11. The tape cartridge of claim 8 wherein at least one rim of the supply reel has an edge with a high coefficient of friction.

12. The tape cartridge of claim 8 wherein the leader block locking surface is manufactured from a material with a high coefficient of friction.

13. The tape cartridge of claim 8 wherein the leader block locking surface and at least one rim of the supply reel has an edge manufactured from a material with a high coefficient of friction.

* * * * *